W. D. TABER.
Egg and Fruit-Carriers.
No. 147,197. Patented Feb. 3, 1874.
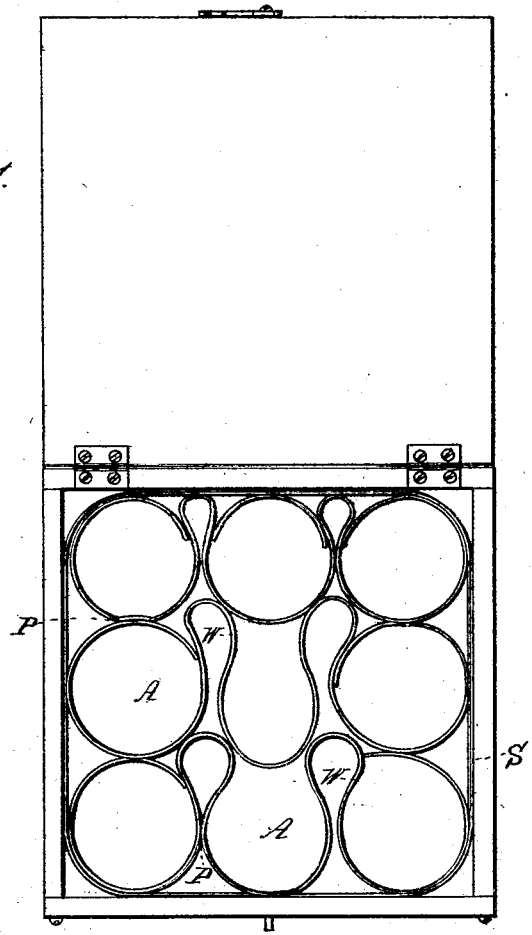
Fig. 1.
Fig. 2.
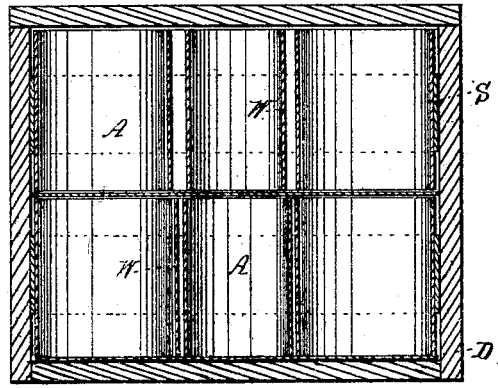
Witnesses
Abram Zwicker
John Toolehouse
Inventor
William D Taber

UNITED STATES PATENT OFFICE.

WILLIAM D. TABER, OF BUFFALO, NEW YORK, ASSIGNOR OF ONE-HALF HIS RIGHT TO PHILIP P. JOSEF AND EDWD. STRIBER, OF SAME PLACE.

IMPROVEMENT IN EGG AND FRUIT CARRIERS.

Specification forming part of Letters Patent No. 147,197, dated February 3, 1874; application filed November 13, 1873.

*To all whom it may concern:*

Be it known that I, WILLIAM D. TABER, of the city of Buffalo, in the county of Erie and State of New York, have invented certain Improvements in Egg and Fruit Carriers, of which the following is a specification:

This invention relates to the use of a new material for the interior division-walls of egg and fruit carriers, and to new and improved methods of forming the cells or pockets.

My object is to produce these interior divisions so cheaply (and at the same time with sufficient strength, flexibility, &c.) that their cost may approximate nearly to that of the materials—chaff, straw, paper, &c.—used in packing eggs and fruit, so that the superior advantages of safety and economy of time, &c., in packing may more than counterbalance the slight excess of cost, and allow them to be given to the purchaser of the articles packed therein, as is customary with the other cheap materials, thus obviating the expense and inconvenience of returning, as is now generally practiced with more costly carriers in use.

This material consists of thin veneer, (white wood being preferred,) cut into strips across the grain, of a width corresponding to the desired depth of the pockets, whereby great flexibility and elasticity are obtained, allowing them very readily to be bent or molded into any desirable shape without further preparation, a property of which, so far as I am aware, no advantage has hitherto been taken in the manufacture of these or similar articles.

In the accompanying drawings, views are given of the series of pockets constituting this invention.

A A are the pockets or cells for containing the egg or fruit; W W, the walls or sides of the same; D, the diaphragm which serves for the bottom.

After a series of cells is formed in molds of the desired shape, I secure such series together as follows: I take a sheet, D, Figure 2, of suitable material, but preferably veneer, which may be thinner than that of which the walls are composed, and fasten the walls to it by dipping their lower edges in glue or other adhesive material, and, placing them upon this sheet, apply sufficient pressure to cause them to adhere.

I find, when veneer is used for this bottom, about eighty to the inch a suitable thickness, being enabled to employ so thin a sheet, as the cementing of the walls to it protects it from splitting apart.

By this process of attaching the walls by their lower edges to the bottom sheet, the tendency of the veneers to split is, in great measure, prevented.

Having thus described my invention, what I claim as new, and desire to secure by Letters Patent, is—

The interior division-walls of egg and fruit carriers constructed, as described, from veneers cut into strips transverse to the grain, bent into shape and secured to the bottom, in the manner set forth.

WILLIAM D. TABER.

Witnesses:
 ABRAM TWICHELL,
 JOHN HOLEHOUSE.